United States Patent
Allan et al.

(10) Patent No.: US 9,100,269 B2
(45) Date of Patent: Aug. 4, 2015

(54) PROVISIONED PROVIDER LINK STATE BRIDGING (PLSB) WITH ROUTED BACK-UP

(75) Inventors: David Allan, Ottawa (CA); Nigel Bragg, Weston Colville (GB); Hadi Nasrallah, Ottawa (CA); Preben Hunnerup, Ottawa (CA)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 1342 days.

(21) Appl. No.: 12/259,560

(22) Filed: Oct. 28, 2008

(65) Prior Publication Data

US 2010/0103813 A1     Apr. 29, 2010

(51) Int. Cl.
  *G01R 31/08*   (2006.01)
  *H04L 12/701*  (2013.01)
  *H04L 12/707*  (2013.01)
  *H04L 12/703*  (2013.01)
  *H04L 12/24*   (2006.01)

(52) U.S. Cl.
  CPC ............... *H04L 45/00* (2013.01); *H04L 45/22* (2013.01); *H04L 45/28* (2013.01); *H04L 41/0663* (2013.01)

(58) Field of Classification Search
  USPC .......................... 370/217, 221, 225, 248, 254
  See application file for complete search history.

(56) References Cited

U.S. PATENT DOCUMENTS

| | | | |
|---|---|---|---|
| 7,093,027 B1 * | 8/2006 | Shabtay et al. ............... 709/239 |
| 7,453,886 B1 * | 11/2008 | Allan ......................... 370/395.5 |
| 7,558,218 B1 * | 7/2009 | Swallow ...................... 370/255 |
| 2006/0045024 A1 * | 3/2006 | Previdi et al. ................ 370/254 |
| 2007/0076719 A1 * | 4/2007 | Allan et al. .................... 370/392 |
| 2007/0086361 A1 | 4/2007 | Allan et al. |
| 2008/0107027 A1 | 5/2008 | Allan et al. |
| 2008/0112331 A1 * | 5/2008 | Long et al. .................... 370/245 |
| 2008/0175144 A1 * | 7/2008 | Lu et al. ........................ 370/228 |
| 2008/0212595 A1 * | 9/2008 | Figueira et al. ............... 370/401 |
| 2008/0219268 A1 * | 9/2008 | Dennison ................... 370/395.2 |
| 2008/0247406 A1 * | 10/2008 | Figueira et al. ............... 370/401 |
| 2008/0281987 A1 * | 11/2008 | Skalecki et al. .............. 709/253 |
| 2009/0010153 A1 * | 1/2009 | Filsfils et al. ................. 370/218 |
| 2009/0168666 A1 * | 7/2009 | Unbehagen et al. .......... 370/254 |
| 2009/0190504 A1 * | 7/2009 | Finn et al. ..................... 370/256 |
| 2009/0201937 A1 * | 8/2009 | Bragg et al. ................... 370/401 |
| 2009/0232005 A1 * | 9/2009 | Mohan et al. .............. 370/241.1 |
| 2009/0234969 A1 * | 9/2009 | Mohan et al. ................. 709/242 |

FOREIGN PATENT DOCUMENTS

| | | |
|---|---|---|
| GB | 2422508 A | 7/2006 |
| WO | 2009056972 A1 | 5/2009 |
| WO | 2009136252 A1 | 11/2009 |

* cited by examiner

*Primary Examiner* — Jung-Jen Liu
(74) *Attorney, Agent, or Firm* — Pearne & Gordon LLP

(57) ABSTRACT

A method of managing traffic flow in a packet network. A working sub-network is provided, which comprises one or more provisioned static working paths between at least one source node and one or more destination nodes in the network, and the working sub-network with a service instance. A backup sub-network is provided, which comprises one or more dynamic protection paths between the at least one source node and the one or more destination nodes, and the backup sub-network associated with the service instance. During a normal operation of the network, forwarding subscriber traffic associated with the service instance through the network using the working sub-network. Following detection of a network failure affecting the service instance, the subscriber traffic associated with the service instance is switched for forwarding through the network using the backup sub-network.

12 Claims, 1 Drawing Sheet

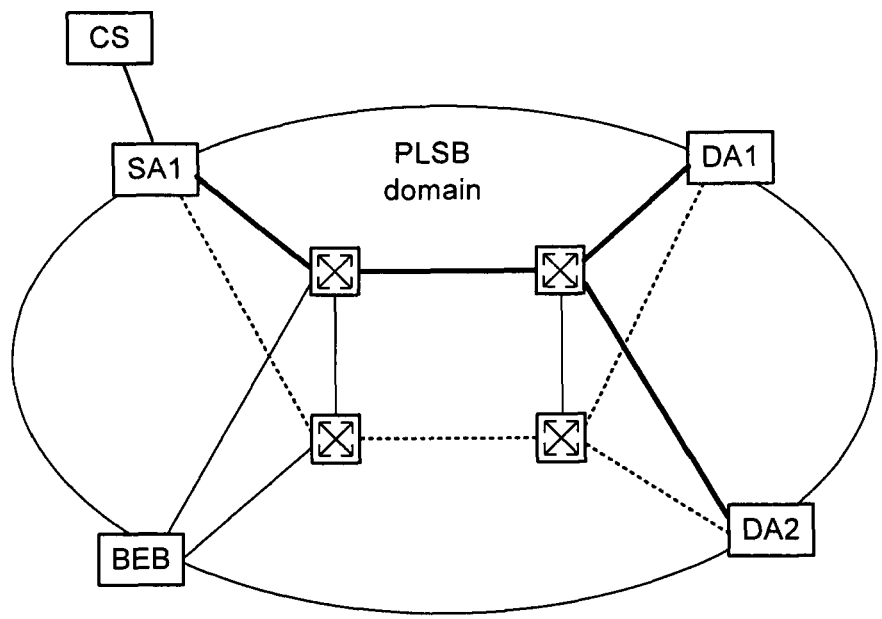

PROVISIONED PROVIDER LINK STATE BRIDGING (PLSB) WITH ROUTED BACK-UP

CROSS-REFERENCE TO RELATED APPLICATIONS

This is the first application filed for the present invention.

MICROFICHE APPENDIX

Not Applicable.

TECHNICAL FIELD

The present invention relates to management of traffic forwarding in packet networks, and in particular to provisioned Provider Link State Bridging (PLSB) with routed back-up.

BACKGROUND OF THE INVENTION

Network operators and carriers are deploying packet-switched communications networks in place of circuit-switched networks. In packet-switched networks such as Internet Protocol (IP) networks, IP packets are routed according to routing state stored at each IP router in the network. Similarly, in Ethernet networks, Ethernet frames are forwarded according to forwarding state stored at each Ethernet switch in the network. The present invention applies to communications networks employing any Protocol Data Unit (PDU) based network and in this document, the terms "packet" and "packet-switched network", "routing", "frame" and "frame-based network", "forwarding" and cognate terms are intended to cover any PDUs, communications networks using PDUs and the selective transmission of PDUs from network node to network node.

Multicast forwarding of data packets (where packets are sent from a source node to multiple destination nodes more or less simultaneously) is of increasing importance as demand for services such as PTV and Video on Demand (VoD) grows.

In Ethernet networks, Provider Backbone Transport (PBT), also known as Provider Back-Bone Bridging-Traffic Engineering (PBB-TE), as described in Applicant's British patent number GB 2422508 is used to provide a unicast Ethernet transport technology. Provider Link State Bridging (PLSB) as described in Applicant's co-pending U.S. patent application Ser. No. 11/537,775 can be used to provide a multicast transport capability for Ethernet networks using IS-IS to set up unicast paths and multicast trees in the network. Both above patent documents are hereby incorporated by reference.

Provider Link State Bridging (PLSB) typically uses protocols such as Intermediate System-Intermediate System (IS-IS) or Open Shortest Path First (OSPF) to exchange topology, addressing and service information to enable the calculation of paths for forwarding packets from any given source node to one or more destination nodes, and to install the forwarding state required to implement those paths. OSPF and IS-IS are run in a distributed manner across nodes of the network so that each node will locally compute paths based on the view of network topology shared by the routing system.

As is known in the art, IS-IS and OSPF are "routing" protocols, in which "Dijkstra" or similar algorithms are used to compute shortest paths between any two nodes in the network. Once computed, these shortest paths can then be used to derive unicast paths and multicast trees, and to determine the forwarding state that must be installed in each node in order to implemented the derived paths and trees. Techniques such as Reverse Path Forwarding Check (RPFC) can be used to mitigate the effect of any loops that may form transiently during periods when multiple distributed peer nodes independently compute paths and install the forwarding state.

An advantage of the above described system is that the same algorithms can be used both at the time that a new service instance is requested, and to recover from a network failure. For example, when a client requests the provisioning of a multicast tree between a given source node and a set of destination nodes, information shared via IS-IS can be used by each node to compute the multicast tree, and install the appropriate forwarding state in each node traversed by that tree. If a topology change occurs in the network, such as a node or link failure, this information will be flooded to all nodes by the protocol's operation, and each node will locally recompute paths as required based on a consistent view of the changed network topology.

While this approach provides a flexible method for recovering from network failures, it suffers a disadvantage in that there is no easy way to implement traffic engineering in a network that is operating properly (i.e. in the absence of a network failure). It computes paths on the basis of available capacity, not offered load. Optimization of paths on the basis of offered load is a substantially more computationally intensive problem typically requiring offline planning tools.

Techniques for managing traffic flows, especially multicast traffic flows, in a packet network which overcome at least some of the above-noted issues remain highly desirable.

SUMMARY OF THE INVENTION

Thus, an aspect of the present invention provides a method of managing traffic flow in a packet network. A working sub-network is provided, which comprises one or more provisioned static working paths between at least one source node and one or more destination nodes in the network, and a service instance is associated with the working sub-network. A backup sub-network is provided, which comprises one or more dynamic protection paths between the at least one source node and the one or more destination nodes, and the service instance is associated with the backup sub-network. During a normal operation of the network, subscriber traffic associated with the service instance is forwarded through the network using the working sub-network. Following detection of a network failure affecting the service instance, the subscriber traffic associated with the service instance is switched and forwarded through the network using the backup sub-network.

The working and backup sub-networks can be virtualized on a common physical network infrastructure.

BRIEF DESCRIPTION OF THE DRAWINGS

Further features and advantages of the present invention will become apparent from the following detailed description, taken in combination with the appended drawings, in which:

FIG. 1 is a block diagram schematically illustrating a Provider Link State Bridging (PLSB) domain in which methods in accordance with the present invention may be implemented.

It will be noted that throughout the appended drawings, like features are identified by like reference numerals.

DETAILED DESCRIPTION OF PREFERRED EMBODIMENTS

The present invention provides a method of managing traffic forwarding in packet networks, particularly applicable to provisioned Provider Link State Bridging (PLSB) with routed back-up. Embodiments of the invention are described below, by way of example only, with reference to FIG. 1

In very general terms, the present invention provides methods for managing traffic flow in a packet network, in which different methods of path computation and failure recovery are implemented, based on the state of the network. More particularly, during a normal operating state of the network, subscriber traffic is forwarded through static paths which are provisioned between source and destination nodes. The subscriber traffic may therefore be routed along paths which best match the available capacity to the offered load, as determined by off-line planning tools. Failure recovery is accomplished by path switching at the network edge. When a service impacting failure occurs, subscriber traffic is forwarded through dynamically computed paths, and subsequent failure recovery is accomplished using dynamic path recomputation to circumvent the impact of further point(s) of failure.

Ethernet bridging technology as extended via PBB-TE and PLSB in particular facilitates this model. One can envision a Backbone VLAN Identifier (B-VID) as an identifier of a sub-network which encompasses a set of one or more paths. A service instance can be arbitrarily assigned to B-VIDs, so that subscriber traffic of the service instance can be forwarded through the sub-network(s) identified by the assigned B-VID (s). Finally, different operational behaviours can be ascribed to different B-VID identified sub-networks. With this arrangement, the act of path switching is generalized to a concept of "network switching"; that is, changing a service association from a provisioned "working" sub-network (B-VID) to a predetermined "backup" sub-network (B-VID), which may be either a diverse provisioned sub-network (B-VID) or a dynamically routed sub-network (B-VID). Further, it is expected that many services may share the network connectivity associated with a B-VID, and one can envision scenarios in which a given B-VID is a working B-VID for some services, and a backup B-VID for others.

The present invention is equally applicable to unicast paths and multicast trees installed in the network. For convenience of description, specific reference will be made to "paths", it being understood that such references shall apply equally to both unicast paths and multicast trees.

For the purpose of understanding the present disclosure, "static" paths should be understood to be unicast paths and/or multicast trees that are provisioned prior to instantiation of a subscriber traffic flow through that path, and remain "nailed-up" for at least the duration of a subscriber communications session or subscribed service instance. If desired, the route traversed by a static path may be computed using a "Dijkstra" algorithm. Additional considerations (such as, for example, network traffic engineering objectives and Service Level Agreements—SLAs) may also be used in the route computation. Once the route of a static path has been computed, forwarding state implementing the path is installed in each of the appropriate nodes, so that subscriber traffic can be properly forwarded through the path. It is anticipated that static paths will normally be computed "off line" (for example by a Operations Administration and Maintenance, OAM, server) rather than by means of a distributed computation process such as IS-IS or OSPF (although the server may utilize substantially the same algorithms). This enables the static paths to be fully computed in advance, and using a broader set of criteria than simply shortest path. The server or other means computing the static paths will ensure that no persistent loops are formed, and the centrally controlled "provisioning" process will ensure that there is no possibility of inadvertently generating a loop during installation of the path.

Because static paths are "provisioned", distributed path computation processes (e.g. IS-IS) will not attempt to modify them when a network failure occurs. Rather, failure recovery of a provisioned path depends on protection switching functionality at each of the involved edge nodes. For example, if a topology change occurs in the network, such as a node or link failure affecting one or more provisioned paths, this information will be flooded to all nodes in the network by means of conventional Link State Packets (LSPs). When the LSPs arrive at an edge node (i.e. a source node or a destination node) of a service for which a provisioned path transits the failed link (or node), a protection switching function is triggered for the impacted service to switch the subscriber traffic from the provisioned path to a predetermined backup path.

In a PLSB network, the above-noted protection switching function can be implemented by associating a service with two B-VIDs, one of which is designated the working B-VID and the other the backup B-VID for that particular service instance. In this case, the actual switching function is performed by changing the default B-VID for the service. Both of the involved B-VIDs may also be utilized by other service instances, and do not need to necessarily replicate the same working/protection relationship for those service instances. Although many service instances may share the connectivity instantiated in a given B-VID, it is possible to envision a failure scenario that requires one service instance to perform a protection switch but does not affect other services sharing that B-VID.

In conventional PLSB networks, the set of traffic flows for each subscriber is assigned a respective Service Instance Identifier (I-SID) identifying that subscriber's virtual network, and backbone edge bridges which host I-components associated with a given I-SID (individual ports on that virtual network) advertise that I-SID into IS-IS. In embodiments of the present invention, this is still true, however state for a given service is duplicated in both the working and back-up B-VIDs. In the case of a dynamically maintained backup B-VID, any service associated with that B-VID injects state into IS-IS in a normal manner, and the edge function selects which B-VID is to be used by the service instance at any given time. With this arrangement, during normal operation of the network, the working B-VID can be associated with the I-SID of the subscriber traffic flow, so that ingress subscriber traffic arriving at an edge node can be encapsulated with the working path's B-VID, use the FDB entries for network connectivity associated with the working B-VID and thus be properly forwarded via provisioned connectivity. If an edge node becomes aware of a network topology change affecting any of the working paths for the service, then the protection switch function in the edge node would simply replace the working B-VID with the specified backup B-VID. Once this switch had been made, the subscriber traffic would (after encapsulation with the backup B-VID) be automatically use the FDB entries associated with the backup B-VID and traffic would be forwarded via the protection paths.

Those of ordinary skill in the art will recognise that the use of a predetermined protection path, and associated protection switching functionality at edge nodes is well known. However, in conventional systems, both the working and protection paths are provisioned in substantially the same manner, and using substantially the same criteria. Thus, for example, if the working path is provisioned to satisfy a selected Quality of Service (QoS) guarantee in a Service Level Agreement (SLA), then the corresponding protection path will normally also be configured to satisfy either the same QoS requirement, or some other QoS requirement as specified in the SLA. Additionally, conventional protection switching schemes are implemented at a granularity of an individual path. That is, when a network failure is detected, subscriber traffic within a path which traverses the failed network element is switched to a corresponding protection (backup) path. Typically, this switching function is implemented without regard to the services associated with the impacted subscriber traffic. This has limitations with respect to multicast resilience, congruency of unicast and multicast, and resilience against multiple simultaneous failures.

In contrast, the present invention extends the concept of per-path protection switching to the granularity of sub-networks, and is aware of impacted services. Thus, the conventional notion of working and protection paths is replaced by working and backup sub-networks, each of which encompasses one or more paths. Furthermore, if a network failure (or other topology change) affects a service, then all of the traffic of that service is switched to the predetermined backup sub-network, even if the failure only impacts one (of possibly several) paths of the working sub-network.

In the present invention, the paths of the working sub-network (B-VID) are provisioned static paths, while the paths of the back-up sub-network (B-VID) are preferably dynamically routed using a distributed path computation algorithm, such as IS-IS or OSPF, and so are maintained by the routing system as a complete "mesh" solution at all times. With this arrangement, the QoS of the dynamically routed backup B-VID is always "best effort", regardless of the QoS specification of any SLA that might apply to the provisioned working B-VID.

If desired, the protection path(s) that the network will use for a given network state can be considered at the same time as the provisioned working path(s) of the working B-VID is (are) computed. If desired, the working path computation can be subject to one or more predetermined constraints. For example, the mesh of working paths may be constrained to maximize diversity with respect to the mesh of protection paths which will be maintained by the routing system under fault-free conditions, which imposes physical diversity between working and protection paths. Similarly PLSB can also use equal cost path computation to achieve at least partial but not necessarily absolute diversity of paths between any two points. The normal mode of operation envisioned is that the combination of the manipulation of topology constraints and use of the ranking of equal cost tie breaking for a given constraint set will produce a set of complete provisioned mesh variations, and the set of variations that the dynamic routed system will produce will also be modelled. Each is assigned a B-VID, and judicious selection of the provisioned working B-VID and dynamic backup B-VID for a given service will be used to minimize the set of possible failures which simultaneously perturb the services on both a working B-VID and the dynamic backup VID for those services. The net result is that in many circumstances, the dynamic backup VID is a significantly diverse path that is continually updated to reflect the current state of surviving resources in the network but is stable and converged at the time of a failure in the working path, and as such will always restore a minimum of best effort connectivity, and by the use of per class packet marking and queuing disciplines combined with limits on network oversubscription will minimize the degradation of service during an outage.

Because each protection path of the backup B-VID is dynamically computed using a distributed path computation algorithm, that portion of the protection mesh solution will be automatically recomputed and updated when a network failure occurs that affects any protection path. Thus, whereas a provisioned working path is static, its corresponding protection path is dynamic, in that it will be dynamically maintained in response to the current network state. So as noted above, when a working path failure occurs that does not affect the protection paths utilized by the affected services, the result is the routing system has maintained the best possible fall back solution, and so switchover will be in the order of notification and protection switching times for each impacted multipoint service.

As may be appreciated, this arrangement enables the planning and deterministic benefits and rapid fail over of provisioned paths to be combined with the multiple failure tolerance of dynamic paths to be realized in the packet network. In particular, provisioned paths enable traffic engineering, Quality of Service (QoS) guarantees and service level differentiation within the network, which are difficult or impossible to ensure with dynamically computed paths except via massive over-provisioning of bandwidth. On the other hand, dynamically computed paths enable a highly flexible mechanism for recovery from network failure, and are robust against multiple failures in the network. For some network service providers, these benefits will be sufficiently important to justify the increased OAM complexity of maintaining two different path computation algorithms, and two different failure recovery mechanisms in a network domain.

According to the present invention, during normal operation of the network, subscriber traffic is routed through a provisioned working path, so that the benefits of traffic engineering QoS guarantees etc. can be realized. However, if a network failure occurs, traffic for the services impacted by the failure are switched to a protection path which has been computed by the dynamic routed system. The traffic that is switched is all end points for a given service, including paths unaffected by the failure. The concept is that the provisioned multipoint full mesh has become a partial mesh due to failure, and hence to properly preserve all aspects of the service connectivity, in particular the multicast aspects, all endpoints for an affected service are switched from the working to the protection B-VID.

Consequently, if simultaneous network failures impact both the working path and its protection path service restoration will be delayed until the dynamic path re-converges, the protection path not being stable through the switchover. Unlike a conventional system in which the protection switching function will fail because the protection path is inoperative, in the present invention, the distributed path computation algorithm (eg IS-IS or OSPF) will recompute the protection paths to circumvent the failure(s), and so guarantee that the subscriber traffic flow can be restored.

Furthermore, it will also be seen that if, during normal operation of a working path, a network failure were to occur that affected only the corresponding protection path, then the distributed path computation algorithm (eg IS-IS or OSPF) will automatically recompute the protection path to circumvent that fault. As a result, the protection path is always ensured to be available in the event of a network failure affecting the working path.

As alluded to earlier in this disclosure, it is also possible to envision a switching hierarchy whereby the initial switchover is to an alternate provisioned B-VID and a further failure such that service connectivity is incomplete in all of the set of provisioned B-VIDs will default to a dynamic backup B-VID. However it should be noted that the requirement for a complete mesh solution for each service in each B-VID means that the amount of state required in the network to achieve this goes up accordingly.

Similarly it is also possible to envision that some services instantiated on the network do not use provisioned paths at all, and simply depend upon the dynamic paths for resiliency. In this way a spectrum of service offerings of differing QOS and resiliency guarantees can be accommodated on a common infrastructure.

As described above, during normal operation of the network, ingress subscriber traffic arriving at an edge node is encapsulated with the working B-VID, mapping all infrastructure switching for that frame to the forwarding entries for the identified working B-VID in the FDB. If the edge node becomes aware of a network failure affecting the any path of the working B-VID, then the protection switching function in the edge node replaces the working B-VID with the backup B-VID. Once this switch had been made, the subscriber traffic is encapsulated with the Backup B-VID and is thus automatically forwarded through a protection path based on the forwarding entries for the identified backup B-VID in the FDB. In order to maintain symmetrical congruence, this protection switching function must execute at every endpoint of every I-SID impacted by the failure of the working path.

This gives rise to a requirement that some means must be provided to ensure that each edge node becomes aware of all I-SIDs in a provisioned B-VID that are impacted by a network topology change, including endpoints using connectivity disjoint from the physical failure (consider three nodes A, B, and C implementing a common service; when the connectivity B-C fails, in this model A, B and C all need to perform a switching operation, even though the A-B and A-C connectivity may remain intact). The local forwarding database at each node contains information from which an association between a given I-SID in a provisioned B-VID and a local network link (from that node to its immediate neighbour) can be derived. However, this information is generally not available to all nodes in the network without defining additional procedures to disseminate provisioned state into the routing system. As a result, when a node receives a notification of a link state change, it is generally not possible to determine which I-SIDs in a provisioned B-VID might have been impacted by that change, unless the impacted link is directly adjacent an edge node.

In some embodiments those I-SIDs which traverse a given link can be directly encoded in the multicast addresses that point to a given link in the FDB for the provisioned B-VID. In other embodiments the list of I-SIDs traversing a given link can be downloaded as part of the "provisioning" process. This permits the node to have knowledge of what provisioned service connectivity transits a given link and be able to advertise such information into the routing system as an attribute of the link. The simplest embodiment is to advertise this information only for failed links (in the LSPs announcing the link failure), in order to minimize the overall amount of state in the routing database.

A node receiving LSPs indicating link failure simply constructs the logical "OR" across the set of LSPs of the set of I-SIDs for which the working or provisioned VID is no longer viable, determines which of those I-components are instantiated locally, and instructs the local implementation to use the working or protection VIDs accordingly. It will be observed that such a technique is automatically revertive for traffic for which the engineered working VID has again become available.

An advantage of this approach is that the conventional forwarding database entries and link state advertisement process, which are commonly utilised in routed packet networks are exploited to also convey information needed for proper protection switching of provisioned paths. Furthermore, this is accomplished without modifying the conventional traffic forwarding and dynamic route computation processes, at least the latter of which is needed for routing of the protection paths. However, this approach also suffers the possible disadvantage that, in a case where the provisioned paths for multiple I-SIDs traverse a link in the network, LSPs advertising state changes of that link will necessarily contain a listing of all of the affected I-SIDs. In some cases, this can represent an onerous amount of data.

In some embodiments, this disadvantage may be overcome by computing a fixed-length digest (e.g. a bloom filter) of the I-SIDs that have provisioned FDB entires that traverse a given link, and advertising that digest in the LSPs announcing the failure of that link (instead of the explicit list of affected I-SIDs). Each edge node can also generate a similar digest of I-SIDs that it hosts. With this arrangement, when an LSP containing a digest is received at an edge node, the digest can be extracted and compared to the local digest to very quickly determine if any I-SIDs hosted by the edge node need to be switched to protection paths and, if so, which ones. A consequence of this is that switching of some services unaffected by a given failure may occur, which is the consequence of the lossy compression of knowledge of the impacted services inherent in a fixed-length digest.

The embodiment(s) of the invention described above is(are) intended to be exemplary only. The scope of the invention is therefore intended to be limited solely by the scope of the appended claims.

We claim:
1. A method of managing traffic flow in a packet network, the method comprising:
providing a working sub-network comprising one or more provisioned static working paths between at least one source node and one or more destination nodes in the network, and associating a service instance with the working sub-network;
providing a dynamic backup sub-network comprising one or more dynamically maintained protection paths between the at least one source node and the one or more destination nodes, and associating the service instance with the dynamic backup sub-network;
during a normal operation of the network, forwarding subscriber traffic associated with the service instance through the network using the working sub-network; and
following detection of a network failure affecting the service instance, switching the subscriber traffic associated with the service instance for forwarding through the network using the dynamic backup sub-network.

2. The method as claimed in claim 1, wherein the working sub-network comprises a set of two or more static working paths provisioned between respective sets of source and destination nodes, and wherein, following detection of a network failure, the subscriber traffic being forwarded in each one of the set of two or more static working paths is switched for forwarding through corresponding dynamic protection paths of the dynamic backup sub-network.

3. The method as claimed in claim 1, wherein, during normal operation of the network, respective forwarding state is installed in the network for both the static working paths and the dynamic protection paths.

4. The method as claimed in claim 3, wherein forwarding traffic using the provisioned static working path comprises:
assigning a Backbone VLAN Identifier (B-VID) of the working sub-network to the subscriber traffic for the service instance, and
forwarding the subscriber traffic in accordance with the assigned B-VID.

5. The method as claimed in claim 4, wherein switching the subscriber traffic of the service instance for forwarding using the backup sub-network comprises:
    assigning a B-VID of the dynamic backup sub-network to the subscriber traffic; and
    forwarding the subscriber traffic in accordance with the assigned B-VID.

6. The method as claimed in claim 1, wherein providing the working sub-network comprises, for each provisioned working path of the working sub-network, installing respective state for the provisioned working path in a database of each node traversed by the provisioned working path, and wherein the state comprises information of a provisioned service instance identifier (I-SID) of the service.

7. The method as claimed in claim 6 wherein the information comprises the I-SID information encoded within a destination address of the provisioned working path.

8. The method as claimed in claim 6 wherein the information comprises a digest of two or more I-SIDs encoded within a data element associated with the provisioned working path.

9. The method as claimed in claim 8 wherein the digest is a bloom filter.

10. The method as claimed in claim 6 further comprising, at a node traversed by the provisioned working path:
    detecting a network failure affecting at least one service; and
    flooding a Link State Packet (LSP) containing the information of the provisioned service instance identifier (I-SID) of the at least one service.

11. The method as claimed in claim 10, further comprising, at an edge node of the network:
    receiving the LSP flooded by the node traversed by the provisioned working path; and
    comparing the information contained in the received LSP to information of service instance identifiers (I-SIDs) of services hosted by the edge node, to identify any services hosted by the edge node that are affected by the detected network failure.

12. The method as claimed in claim 1, further comprising providing a provisioned backup sub-network comprising one or more provisioned protection paths between the at least one source node and the one or more destination nodes in the network, and associating the service instance with the provisioned backup sub-network; and wherein:
    following detection of a first network failure affecting the service instance, the subscriber traffic is forwarded using the provisioned backup sub-network; and
    following detection of a second network failure affecting the service instance, the subscriber traffic is forwarded using the dynamic backup sub-network.

* * * * *